United States Patent Office 2,871,236
Patented Jan. 27, 1959

2,871,236

POLYURONIC ACID CHOLINE-METAL SALTS

Edwin F. Bryant, Corona, Calif., assignor to Sunkist Growers, Inc., Los Angeles, Calif., a corporation of California No Drawing. Application May 14, 1956
Serial No. 584,417

9 Claims. (Cl. 260—209)

This invention relates generally to compounds of choline with polyuronic acids and metal salts and is more particularly concerned with the product resulting from the reaction of choline with polygalacturonic acid and a metal salt and to the process for preparing that product.

Choline is a well known lipotropic agent finding extensive use in pharmaceutical preparations and nutritional supplements in the treatment of liver diseases, in weight reduction diets, in arthrosclerosis, and in other disorders resulting from deposition of cholesterol and related compounds in the vascular system. The physical properties of choline present the major obstacles to its pharmaceutical and nutritional utilization. Choline is both malodorous and unpleasant tasting to the extent that it can not be tolerated in routine therapy. Furthermore, is, as well as a substantial percentage of its known salts are so hygroscopic as to limit their medicinal or nutritional use on a practical basis to liquid form. On the other hand, those choline salts which are non-hygroscopic in nature, such as choline 1-2-3-4 butane-tetracarboxylate introduce into the body a substance of unproven beneficial biological activity. While such substances may have no detrimental physiological influences, it is nevertheless desirable to utilize a choline supply compound which adds no substance other than one naturally present in an average diet.

My invention is therefore directed to the provision of a nonhygroscopic binary choline metal salt of polygalacturonic acid, which is free from unpleasant odors and unpleasant tastes.

My new salts are prepared by reacting polygalacturonic acid with a small excess of choline and then precipitating the desired salt by addition of calcium chloride or some other metal salt or salts. The reaction may generally be illustrated as follows:

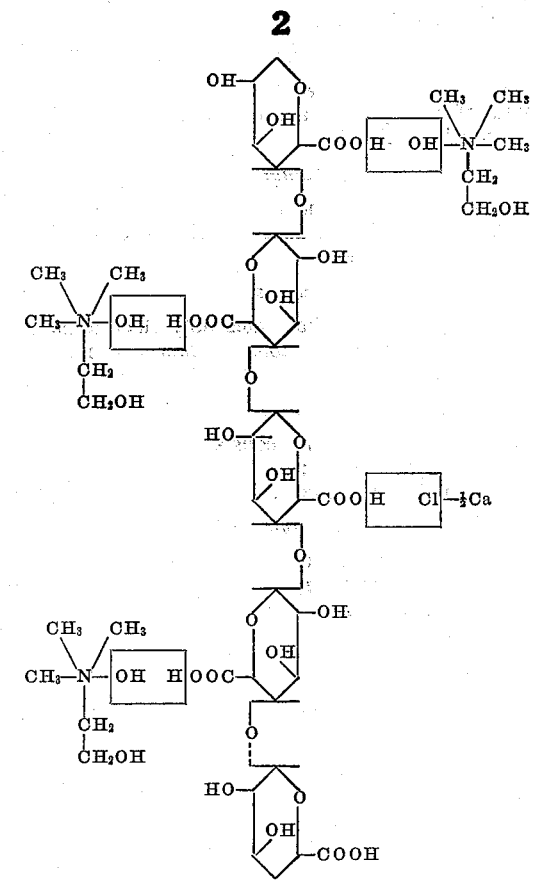

I have found that choline may be reacted with various polyuronic acids and precipitated with any suitable metallic salt or combination of different metallic salts. The following examples illustrate the method of preparation of the new salts of this invention:

*Example I*

In the preparation of calcium choline polygalacturonate, I mixed 20 parts of polygalacturonic acid with 25 parts of a 48 percent aqueous solution of choline and agitated the mixture until completion of the reaction. This was indicated by the formation of a yellow viscous solution and required a 15 minute period for completion. To this reaction mixture was added a 4 part quantity of calcium chloride dissolved in 15 parts of water and the mixture was agitated thoroughly; forming, almost immediately, a hydrated crumbly calcium choline polygalacturonate mass. This reaction product was then placed in a laboratory blender and comminuted with 250 parts of isopropanol in order to remove any unreacted choline. It was filtered and dried after a further alcohol wash and filtration. The resulting choline calcium polygalacturonate was a free flowing nonhygroscopic powder substantially tasteless and colorless. It was soluble in water.

The products of the following examples were prepared in a manner identical to that disclosed above except that the indicated quantities of the recited materials were utilized. Isopropanol, ethanol, butanol, or acetone were alternatively used to remove unreacted quantities of choline.

*Example II*

10 parts polygalacturonic acid;
12 parts of a 48 percent aqueous solution of choline;
3 parts ferric chloride.

*Example III*

5 parts polygalacturonic acid;
6 parts of a 48 percent aqueous solution of choline;
1 part magnesium chloride.

*Example IV*

10 parts polygalacturonic acid;
12 parts of a 48 percent aqueous solution of choline;
5 parts cobaltous chloride.

*Example V*

25 parts polygalacturonic acid;
30 parts of a 48 percent aqueous solution of choline;
4 parts sodium chloride.

*Example VI*

25 parts of partially methoxylated polygalacturonic acid;
7 parts of a 48 percent aqueous solution of choline;
4 parts of calcium chloride.

*Example VII*

30 parts of a 48 percent aqueous solution of choline;
4 parts of calcium chloride;
25 parts of polymannuronic acid.

*Example VIII*

30 parts of a 48 percent aqueous solution of choline;
4 parts of calcium chloride;
25 parts of alginic acid.

The products of the foregoing examples were: choline iron polygalacturonate; choline magnesium polygalacturonate; choline cobalt polygalacturonate; choline sodium polygalacturonate; a choline calcium salt of a partially methoxylated polygalacturonic acid; choline calcium mannuronate and choline calcium alginate. All of the polyuronic acid metal salts of choline prepared in accordance with the foregoing examples were free flowing, nonhygroscopic, tasteless and odorless salts. Choline calcium polygalacturonate, choline magnesium polygalacturonate and the choline calcium salt of a partially methoxylated polygalacturonic acid were soluble in water. Choline sodium polygalacturonate was fairly soluble while choline calcium alginate and choline calcium mannuronate were slightly soluble and choline cobalt polygalacturonate and choline iron polygalacturonate were insoluble. On acidification, the iron and cobalt salts showed better hydration. It will thus be apparent that the choline base supplying compounds of my invention may be readily utilized in pharmaceutical and nutritional preparations.

Having fully described my invention, I claim:

1. A polyuronic acid metal salt of a choline base.
2. A polygalacturonic acid metal salt of choline.
3. Choline calcium polygalacturonate.
4. Choline iron polygalacturonate.
5. Choline magnesium polygalacturonate.
6. Choline cobalt polygalacturonate.
7. Choline calcium alginate.
8. A process for preparing a polyuronic acid metal salt of a choline base which comprises reacting with agitation a mixture of an aqueous suspension of a polyuronic acid and choline, adding to said reacted aqueous solution a metal salt with agitation to obtain an amorphous precipitate, separating the resulting liquor from said amorphous precipitate, washing said precipitate with alcohol and drying said precipitate.
9. The process for preparing calcium choline polygalacturonate which comprises reacting an aqueous solution of choline with polygalacturonic acid to form a yellow viscous solution, adding to said viscous solution an aqueous solution of calcium chloride, agitating said solution until a hydrous amorphous precipitate is formed, filtering the liquor from said precipitate, washing said precipitate with alcohol and drying said precipitate.

References Cited in the file of this patent

UNITED STATES PATENTS

| Re. 22,650 | Bley | June 12, 1945 |
| 2,494,911 | Steiner et al. | Jan. 17, 1950 |